United States Patent
Yie et al.

(10) Patent No.: US 9,967,582 B2
(45) Date of Patent: May 8, 2018

(54) HYBRID DELIVERY METHOD AND RECEPTION METHOD FOR MMT PACKAGED SVC VIDEO CONTENTS

(71) Applicant: HUMAX CO., LTD., Seongnam-si, Gyeonggi-do (KR)

(72) Inventors: Alex Chungku Yie, Incheon (KR); Yong-Jae Lee, Seongnam-si (KR); Hui Kim, Namyangju-si (KR)

(73) Assignee: HUMAX CO., LTD., Seongnam-si (KR)

( * ) Notice: Subject to any disclaimer, the term of this patent is extended or adjusted under 35 U.S.C. 154(b) by 544 days.

(21) Appl. No.: 14/387,244

(22) PCT Filed: Mar. 22, 2013

(86) PCT No.: PCT/KR2013/002425
§ 371 (c)(1),
(2) Date: Mar. 30, 2015

(87) PCT Pub. No.: WO2013/141666
PCT Pub. Date: Sep. 26, 2013

(65) Prior Publication Data
US 2015/0201207 A1    Jul. 16, 2015

(30) Foreign Application Priority Data

Mar. 23, 2012 (KR) .......................... 10-2012-0029669
Mar. 22, 2013 (KR) .......................... 10-2013-0031171

(51) Int. Cl.
H04N 19/463    (2014.01)
H04N 19/30    (2014.01)
(Continued)

(52) U.S. Cl.
CPC ........... *H04N 19/463* (2014.11); *H04N 19/30* (2014.11); *H04N 21/234* (2013.01); *H04N 21/234327* (2013.01); *H04N 21/631* (2013.01)

(58) Field of Classification Search
CPC .... H04N 19/463; H04N 19/30; H04N 21/234; H04N 21/234327; H04N 21/631
(Continued)

(56) References Cited

U.S. PATENT DOCUMENTS

2002/0021761 A1    2/2002    Zhang et al.
2005/0180381 A1*   8/2005    Retzer ................. H04J 3/1682
                                                 370/349
(Continued)

FOREIGN PATENT DOCUMENTS

KR    10-0738930 B1    7/2007
KR    10-2009-0066134 A    6/2009
(Continued)

OTHER PUBLICATIONS

International Search Report of PCT/KR2013/002425 dated Jun. 10, 2013, citing the above reference(s).

*Primary Examiner* — Jay Au Patel
*Assistant Examiner* — Salame Amr
(74) *Attorney, Agent, or Firm* — Hauptman Ham, LLP

(57) ABSTRACT

A hybrid delivery method of contents for dividing contents according to the number of delivery networks and transmitting the divided contents is disclosed. The hybrid delivery method of contents comprises the steps of: enabling a server to generate composition information of divided Scalable Video Coding (SVC) video contents by dividing the SVC video contents to be delivered from the server to a client; and transmitting the divided SVC video contents to the client using a plurality of delivery networks. Therefore, the hybrid delivery method of contents can efficiently use various delivery networks.

16 Claims, 10 Drawing Sheets

(51) Int. Cl.
*H04N 21/234* (2011.01)
*H04N 21/2343* (2011.01)
*H04N 21/63* (2011.01)

(58) Field of Classification Search
USPC .................................................. 375/240.26
See application file for complete search history.

(56) References Cited

U.S. PATENT DOCUMENTS

| | | | |
|---|---|---|---|
| 2008/0232452 A1* | 9/2008 | Sullivan | H03H 17/0294 375/232 |
| 2010/0146349 A1* | 6/2010 | Asou | G01B 31/318555 714/731 |
| 2010/0208042 A1* | 8/2010 | Ikeda | G11B 20/1251 348/53 |
| 2012/0185907 A1* | 7/2012 | Park | H04N 21/236 725/110 |
| 2012/0230438 A1* | 9/2012 | Shrum, Jr. | H04N 19/30 375/240.26 |
| 2015/0020131 A1* | 1/2015 | Choi | H04N 21/234327 725/109 |
| 2015/0150055 A1* | 5/2015 | Hwang | H04N 21/235 725/54 |

FOREIGN PATENT DOCUMENTS

| | | |
|---|---|---|
| KR | 10-2010-0062811 A | 6/2010 |
| WO | 2011-101201 A1 | 8/2011 |

* cited by examiner

HYBRID DELIVERY METHOD AND RECEPTION METHOD FOR MMT PACKAGED SVC VIDEO CONTENTS

BACKGROUND OF THE INVENTION

Field of the Invention

The present invention relates to a method of transmitting and receiving video contents, and more particularly, to a method of transmitting MMT-packaged video contents through a plurality of transmission networks.

Discussion of the Related Art

After standardization of MPEG-2, new video compression standards (or audio compression standards) such as MPEG-4, H.264/AVC, and scalable video coding (SVC) have continually been developed, and each new standard has formed a new market, thereby widening the utilization area of MPEG standard. However, transmission technologies such as MPEG-2 transport system (TS) have been widely used in a digital broadcast, a mobile broadcast (T-DMB, DVB-H, etc.), etc. for about 20 years without a significant change, and even the technologies are widely used in multimedia transmission through Internet, i.e., IPTV service.

However, the multimedia transmission environment at the time when MPEG-2 TS was developed and the today's multimedia transmission environment are going through significant changes. For example, MPEG-2 TS standard was developed at that time in consideration of transmitting multimedia data through the ATM network, but today, it is difficult to find an example which is used for this purpose. Further, requirements of multimedia transmission by using Internet, etc. were not considered at the time of making MPEG-2 TS standard, and thus there are elements which are not efficient in multimedia transmission through Internet. Hence, the establishment of MPEG Media Transport layer (MMT) which considers the multimedia service in Internet which fits a changing multimedia environment is being considered as a very important subject.

Likewise, an important reason why the MMT standardization is performed is that the MPEG2-TS standard, which was made 20 years ago, is not optimized for the recent IPTV broadcast service, Internet, environment, etc., and thus the MMT is standardized as a new transmission technology standard in the MPEG by an urgent need of the optimized multimedia transmission international standard in the multimedia transmission environment in recent various heterogeneous networks.

Further, the multimedia contents services are being generalized on the basis of the video in the convergence environment of communication and broadcasting along with the high speed of the wireless network and Internet. In the convergence environment for contents consumption where terminals of various performances such as a smartphone and a tablet PC are mixed as well as the existing TV or PC, services, which allow the seamless use of the video, music, game, and data, are called N-screen services.

In such various terminals, contents of various resolutions, which fit each terminal, are consumed, and as a mobile service becomes available, the contents consumption environment which changes the network environment in real time is being made. In order to provide high-quality contents which fit the consumption environment which changes in real time, the existing video encoding scheme which supports a single format is not sufficient.

In this respect, a study on scalable video coding (SVC) is in active progress. The SVC has been designed to allow real time adaptation to various transmission environments and terminal performance. That is, this is a video encoding scheme which allows real time adaptation which supports a format which fits a variable heterogeneous consumption environment such as the resolution and network state which are various required according to the terminal.

As described above, SVC video contents, which may provide appropriate video contents adaptively according to various terminal performances and the changing network environment, and a plurality of transmission networks may be utilized when transmitting such SVC video contents through various heterogeneous networks in MMT scheme.

SUMMARY OF THE INVENTION

An object of the present invention is to provide a hybrid transmission method of MMT-packages SVC video contents having optimal transmission efficiency in various environments by separately transmitting layers of SVC video contents to correspond to the number of transmission networks.

Further, another object of the present invention is to provide a method of receiving SVC video contents having the optimal transmission efficiency in various environments by receiving and aggregating layers of SVC video contents which have been separately transmitted to correspond to the number of the transmission networks.

In accordance with an aspect of the present invention, a hybrid delivery method of scalable video coding (SVC) video contents includes fragmenting SVC video contents to be transmitted to a client by a server, and transmitting the fragmented SVC video contents to the client by using a plurality of transmission networks.

The fragmented SVC video contents may include at least one of an MPEG Media Transport (MMT) asset of a base layer and an MMT asset of an enhanced layer.

The MMT asset may include a Media Processing Unit (MPU), and the MPU includes fragmentation information of the SVC video contents.

The MPU may include an MMT hint track including the fragmentation information of the MPU.

The MMT hint track may include fragmentation information of the SVC video contents.

The fragmenting of the SVC video contents to be transmitted to the client by the server may include fragmenting the SVC video contents to be transmitted to the client by the server and generating composition information of the fragmented SVC video contents.

The composition information may include at least one of media type information of MMT assets included in the fragmented SVC contents referenced by the composition information, a media size, the number of layers, and information on whether the MMT assets are a base layer or an enhanced layer, wherein the media type is one of a video, an audio, and a subtitle.

The composition information may be included in at least one of package information of an MMT package, a header and a payload of an MMT packet.

The transmitting of the fragmented SVC video contents may include transmitting the fragmented SVC video contents and the composition information to the client when the composition information exists outside the fragmented SVC video contents.

The generating of the composition information by fragmenting the SVC video contents may include detecting the number of transmission networks through which SVC video contents to be transmitted to the client by the server may be transmitted, fragmenting the SVC video contents to correspond to the number of the detected transmission networks, and generating composition information of the fragmented SVC video contents.

The fragmented SVC video contents may individually form one MMT package.

A signaling message for synchronization between the fragmented SVC video contents which are transmitted through the plurality of transmission networks may be transmitted along with the SVC video contents.

The signaling message may include clock relation information for synchronization of different types of timestamps.

In accordance with another aspect of the present invention, a method of receiving contents includes receiving SVC video contents which are fragmented from a server through a plurality of transmission networks, and aggregating the fragmented SVC video contents.

The receiving of the fragmented SVC video contents may include receiving the fragmented SVC video contents and the composition information from the server when the composition information exists outside the fragmented SVC video contents.

The receiving of the fragmented SVC video contents may include generating second composition information indicating relationship between the received fragmented contents and a part of fragmented contents which are received based on composition information.

The aggregating of the fragmented SVC video contents may include aggregating the fragmented SVC video contents based on composition information which is included in the fragmented SVC video contents.

The method may further include correcting an error of the received SVC video contents.

The correcting of the error of the SVC video contents may further include correcting the error by using received data of another layer.

The method may further include receiving a signaling message for synchronization between the fragmented SVC video contents.

The signaling message may include Clock Relation Information (CRI) for synchronization of different types of timestamps.

The method may further include generating a system clock by using the Clock Relation Information of the signaling message.

DETAILED DESCRIPTION OF THE EMBODIMENTS

Figure 1:
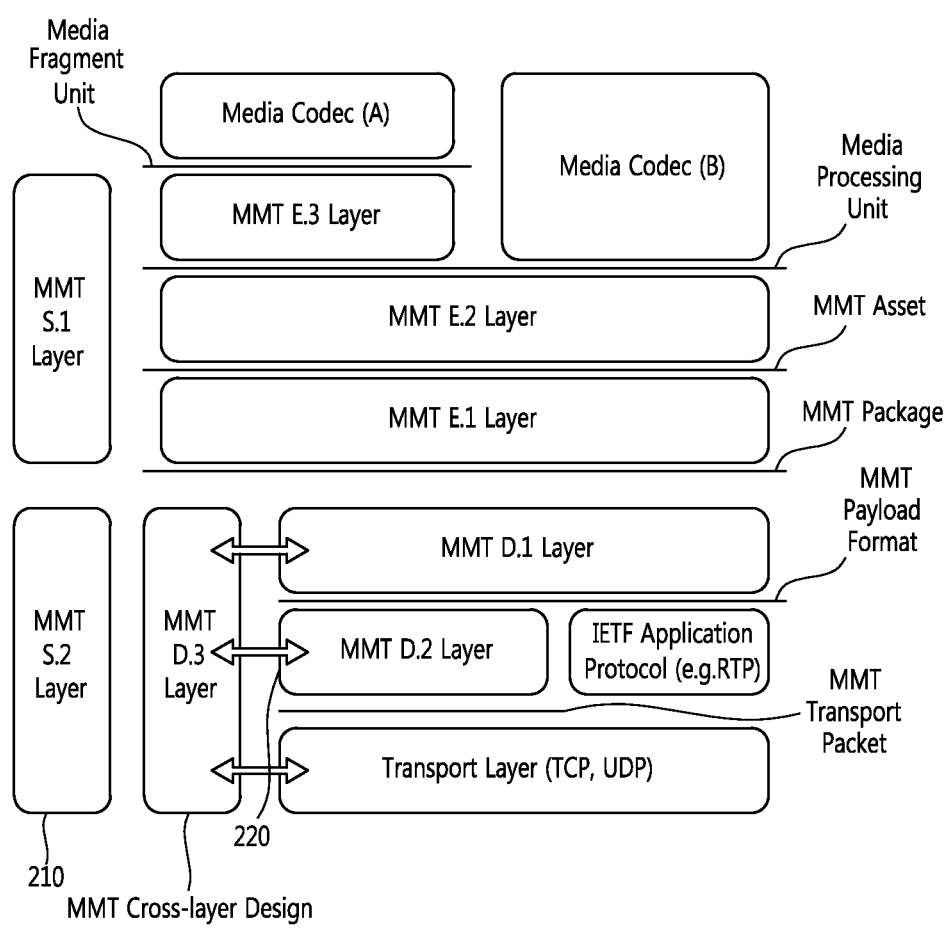
FIG. 1 is a conceptual diagram illustrating an MMT layer structure according to an embodiment of the present invention.

The present invention may be variously changed and may have various embodiments, and thus here some of the embodiments will be illustrated and explained in detail.

However, this is not to limit the present invention to specific embodiments, but it should be understood that the present invention includes all changes, equivalents, and substitutes within the concept and technology of the present invention.

The terms such as "first" and "second" may be used in explaining various elements, but the elements should not be limited by the terms. The terms are used only to distinguish one element from another. For example, a first element may be referred as a second element while not going beyond the scope of the rights of the present invention, and in a similar manner, the second element may be referred to as the first element. The expression "and/or" includes a combination of a plurality of related items or one of the items.

When an element is mentioned as being "connected" to another element, it may mean that the element is directly connected to the another element, but there may be another element between the elements. In contrast, when an element is mentioned as being "directly connected" to another element, it should be understood that there is no other element between the elements.

The terms used in the present application are used only to explain some elements and are not used to limit the present invention. A singular express includes a plural expression unless clearly stated otherwise. In the present specification, it should be understood that terms such as "include" and "have" are used to explain the existence of characteristics, numbers, steps, operations, elements, parts, and a combination thereof, but the terms do not exclude the possibility of addition of one or more characteristics, numbers, steps, operations, elements, parts, and a combination thereof.

Unless defined otherwise, all terms used here including technical or scientific terms have the same meaning as what is generally understood by one of ordinary skill in the art. Generally used, predefined terms should be understood to have the meaning which coincides with the meaning in the context of the related art, and unless clearly defined, the terms should be not understood in an excessively formalistic manner.

Hereinafter, embodiments of the present invention will be described in detail. The same reference numeral is used for the same element in drawings, and the redundant description on the same element is omitted.

Hereinafter, some terms used in the specification are defined as follows.

Non-timed data defines all data elements which are consumed without specifying time. Non-timed data may have a time range in which data may be executed or started.

Timed data defines data elements associated with specific time which is decoded and presented.

Presentation is defined as an operation which is performed by one or more devices so that a user may experience one contents component or one service (e.g., watching a movie).

Service is defined as one or more contents components which are transmitted for presentation or storage.

Service information is defined as metadata which describe one service, and characteristics and components of the service.

Access Unit (AU) is the smallest data object and may have time information as an attribute. If time information for decoding and presentation becomes related with undesignated, encoded media data, AU is not defined.

Media Fragment Unit (MFU) is a general container which is independent of any specific codec, and accommodates encoded media data which may be independently consumed by a media decoder. The MFU accommodates information which may be used in a transport layer with a small and same size.

Media Processing Unit (MPU) is a general container which is independent of any specific media codec, and accommodates at least one AU and information related to additional transmission and consumption. The MPU accommodates part of data which do not belong to AU range for non-timed data. The MPU is encoded media data which may be completely and independently processed. In this respect, the process refers to encapsulation as MMT package for transmission or forming a packet. However, in some cases, the MPU may not be independently and completely consumed in the media codec server for scalable video coding (SVC) and multiview video coding (MVC).

The MMT asset is a logical data object which is configured as at least one MPU along with the same MMT asset ID or is configured as a specific data lump along with a format which is defined in another standard. The MMT asset is the largest data unit to which the same composition information and transmission characteristics are applied.

The MMT asset delivery characteristics (MMT-ADC) are description which is related to QoS requirements for transmitting the MMT asset. The MMT-ADC is expressed in a manner that does not reveal a specific transmission environment.

MMT composition information (MMT CI) explains a spatial and temporal relation between MMT assets.

The MMT package is a collection of logically structural data, and is composed of at least one MMT asset, MMT-composition information, MMT-asset transmission characteristics, and descriptive information.

The MMT packet is a data format which is generated or consumed by MMT protocol.

The MMT payload format is a format for the payload of an MMT signaling message or an MMT package which is to be transmitted by an Internet application layer protocol (e.g., RTP) or the MMT protocol.

A content component or media component is defined as media of a single type or a subset of the media of a single type. Some examples of the content component or media component are a video track, movie subtitles, and an enhanced layer of video.

The content is defined as a set of contents components such as a movie and a song.

The hybrid delivery is defined as simultaneous transmission of one or more contents components through one or more physical different type networks or simultaneous transmission through the physically same type network or different networks.

Hereinafter, a first network and a second network include various networks such as a broadcast network, a broadband network, a cable network, and a satellite communication network.

Hereinafter, at the hybrid transmission, the transmission may be performed in MMT asset units, substream units, MFU units, MPU units, MMT package units, or MMT packet units, and when the video contents are composed of a plurality of layers such as the first layer and the second layer, the hybrid transmission may be performed in layer units.

Hereinafter, embodiments of the present invention will be described in detail with reference to the attached drawings. In the present specification, the same reference numeral is used for the same element in the drawings for better understanding, and the overlapping description on the same element is omitted.

FIG. 1 is a conceptual diagram illustrating an MMT layer structure according to an embodiment of the present invention.

Referring to FIG. 1, a mpeg media transport (MMT) layer structure includes the functional area of an encapsulation layer, a delivery layer, and a signaling layer. The MMT layer operates on the transport layer.

The encapsulation layer (E-layer) defines the logical structure of data units to be processed by an object that observes MMT, MMT package, and media contents. In order to provide essential information for adaptive transmission, MMT package specifies components including media contents and the relationship between the components. The format of data units is defined to encapsulate encoded media so as to be stored in or transmitted to the payload of the transmission protocol and to be easily converted between them.

The encapsulation layer may perform such functions as packetization, fragmentation, synchronization, and multiplexing of transmitted media.

Various kinds of multimedia components may be encapsulated and combined so as to be transmitted and consumed by a function which is provided in the encapsulation layer. The encapsulated media components and configuration information of the media components are provided in the function area of the encapsulation layer.

The main information for the encapsulated media components may include aggregation, prioritization, dependency of media fragments, timing information and structural information of MPU, identification information of MMT asset 150, initialization information, and codec information. The configuration information of media components may include identification information of MMT package 160 and MMT asset 150, configuration information having the list of MMT asset 150, composition information 162 of MMT assets 150 within the MMT package 160, and delivery characteristics information 164.

The encapsulation layer may be composed of MMT E.1 layer, MMT E.2 layer, and MMT E.3 layer.

E.3 layer generates a media processing unit (MPU) by encapsulating a media fragment unit (MFU) which is provided from the media codec (A) layer.

The media data, which is encoded from the upper layer, is encapsulated as MFU. The type and value of encoded media is abstracted so that MFU may be generally used in a specific codec technology. This allows the lower layer to process MFU without an approach to the encoded media, and the lower layer calls the encoded media data from the network or the buffer of the storage unit and transmits the media data to the media decoder. The MFU has the sufficient information media part unit for performing the operation.

The MFU may have a format which may be independent of an arbitrary specific codec and may load data units which may be independently consumed in the media decoder. For example, the MFU may become a picture or slice of the video.

One or a group of a plurality of MFUs, which may be independently transmitted and decoded, generate an MPU. Non-timed media, which may be independently transmitted and executed, also generate an MPU. The MPU allows a quick approach to MFU and partial consumption by describing an inner structure such as an array of MFU and pattern.

E.2 layer generates MMT asset by encapsulating a generate MPU in E.3 layer.

The sequence of MPU from the same source component generates MMT asset. The MMT asset is packaged by MMT package, and is configured with other things by Composition Information (CI) and Transport Characteristics (TC), is multiplexed with other things by MMT payload format, and is transmitted by MMT protocol.

MMT asset is a data entity which is composed of one or a plurality of MPUs from a single data source, and is a data unit in which CompositionInformation (CI) and Transport Characteristics (TC) are defined. The MMT asset may correspond to packetized elementary streams, for example, video, audio, program information, MPEG-U widget, JPEG image, MPEG 4 file format, and M2TS (MPEG transport stream).

E.1 layer generates an MMT package by encapsulating MMT asset which is generated in E.2 layer.

MMT asset is packaged with MMT-Composition Information (MMT-CI) for a later response of the same user experience along with or separately from other functional area-transport area and signal area. The MMT package is also packaged with transmission characteristics which select an appropriate transmission method for each MMT asset to satisfy the sensible quality of MMT asset.

The MMT package may be composed of one or more MMT assets along with additional information such as Composition Information (CI) and Transport Characteristics (TC). The MMT package may correspond to the program of MPEG-2 TS.

The composition information includes information on relation between MMT assets, and when one content is composed of a plurality of MMT packages, the composition information may include information for representing relationship between a plurality of MMT packages.

The transport characteristics may include transport characteristic information which is needed to determine the delivery condition of the MMT asset or MMT packet, for example, the traffic description parameter and QoS descriptor.

The delivery layer (D-layer) defines an application layer protocol and format of the payload. The payload format is defined to transmit encoded media data regardless of the media type or encoding method.

The delivery layer (D-layer) may perform network flow multiplexing, network packetization, QoS control, etc. which are transmitted through a network.

The delivery layer is in charge of multiplexing of the media such as video and audio which is transmitted through the network, aggregation and/or fragmentation of the packet level, network packetization, QoS control, synchronization function, and the interface with the transport layer such as the existing RTP, the transport layer such as the existing UDP and TCP, the encapsulation layer, and signaling layer between the transport layer and the encapsulation layer.

The delivery layer identifies different types of payloads which have been handed over from the encapsulation layer in order to handle the payloads from the encapsulation layer.

The delivery layer may handle temporary relationship between packets which are transmitted through different networks and different channels. The synchronization function may include a hybrid network synchronization by using the timestamp, etc.

The delivery layer may handle timing constraints of the MMT delivery packets for real time media transmission.

The delivery layer may perform the error control of MMT media packets such as forward error correction and retransmission.

The delivery layer may perform flow control of the MMT media packet.

The delivery layer may perform interaction with a different MMT layer as well as the lower layers (MAC, PHY) through the cross layer design for QoS of a predetermined level for the transmission of MMT media packets.

Further, the delivery layer may provide a function for providing group communication.

The delivery layer may be composed of MMT D.1 layer, MMT D.2 layer, and MMT D.3 layer as illustrated in FIG. 1.

D.1 layer receives an MMT package which is generated in E.1 layer, and generates a MMT payload format. The MMT payload format is a payload format for transmitting MMT asset and transmitting information for consumption by other existing application transmission protocols such as MMT application protocol or RTP. The MMT payload may include fragments of MFU along with information such as AL-FEC.

D.2 layer receives the MMT payload format which is generated in D.1 layer, and generates MMT transport packet or MMT packet. The MMT transport packet or MMT packet is a data format which is used in the application transmission protocol for MMT.

D.3 layer supports QoS by providing a function of exchanging information between layers by the cross-layer design. For example, D.3 layer may perform QoS control by using QoS parameter of MAC/PHY layer. The QoS parameter of MAC/PHY may become, for example, a bitrate, a packet loss ratio, an expected delay, or an available buffer size.

The signaling layer (S layer) performs the signaling function. For example, the session initialization/control/management of the transmitted media, the server-based and/or client-based trick mode, the service discovery, synchronization, and the signaling function for the interface function with other layers, i.e., the delivery layer and the encapsulation layer. The synchronization function may include synchronization control in the hybrid network.

The signaling layer defines the format of the message which manages the delivery and consumption of the MMT package. The message for the consumption management is used to transmit the structure of the MMT package and the message for the delivery management is used to transmit the structure of the payload format and configuration of the protocol.

The signaling layer may be composed of MMT S.1 layer and MMT S.2 layer as illustrated in FIG. 1.

S.1 layer may perform the service discovery, media session initialization/termination, media session presentation/control, and the interface function with the delivery layer and encapsulation layer. S.1 layer may define the format of control messages between applications for media presentation session management. The expression session management may define the format of the control message which is exchanged between applications for provision of information which is required in media expression, session management, and media consumption.

S.2 layer may perform delivery session management. The delivery session management may define the format of the control message which is exchanged between delivery end points of the delivery layer about flow control, delivery session management, delivery session monitoring, error control, and hybrid network synchronization control.

S.2 layer may include delivery session establishment and release, delivery session management (delivery session monitoring, flow control, error control, etc.), resource reservation for the set delivery session, signaling for synchronization under the complicated delivery environment, and signaling for the adaptive delivery in order to support the operation of the delivery layer. The signaling which is needed between the sender and the receiver may be provided. That is, S.2 layer may provide signaling which is needed between the sender and the receiver in order to support the operation of the delivery layer as described above. Further, S.2 layer may be in charge of the interface function between the delivery layer and the encapsulation layer.

The control message or control information may be generated in the signaling layer and be transmitted through the broadcasting network and/or broadband network.

When transmitted through both the broadcasting network and broadband network, the function of the control message, which is transmitted through the broadcast network, may be the same as the function of the control message which is transmitted through the broadband network. The syntax and format of the control message may become different depending on the type of the application and delivery. For example, in the case of the hybrid transmission, the same common control information and the same common format may be used in the control message which is respectively transmitted to the broadcast network and the broadband network. Further, in the case of the hybrid transmission, the same common control information may be transmitted in different formats for the broadcasting network and the broadband network. Further, in the case of the hybrid transmission, different control information and different formats may be transmitted for the broadcasting network and the broadband network.

Figure 2:
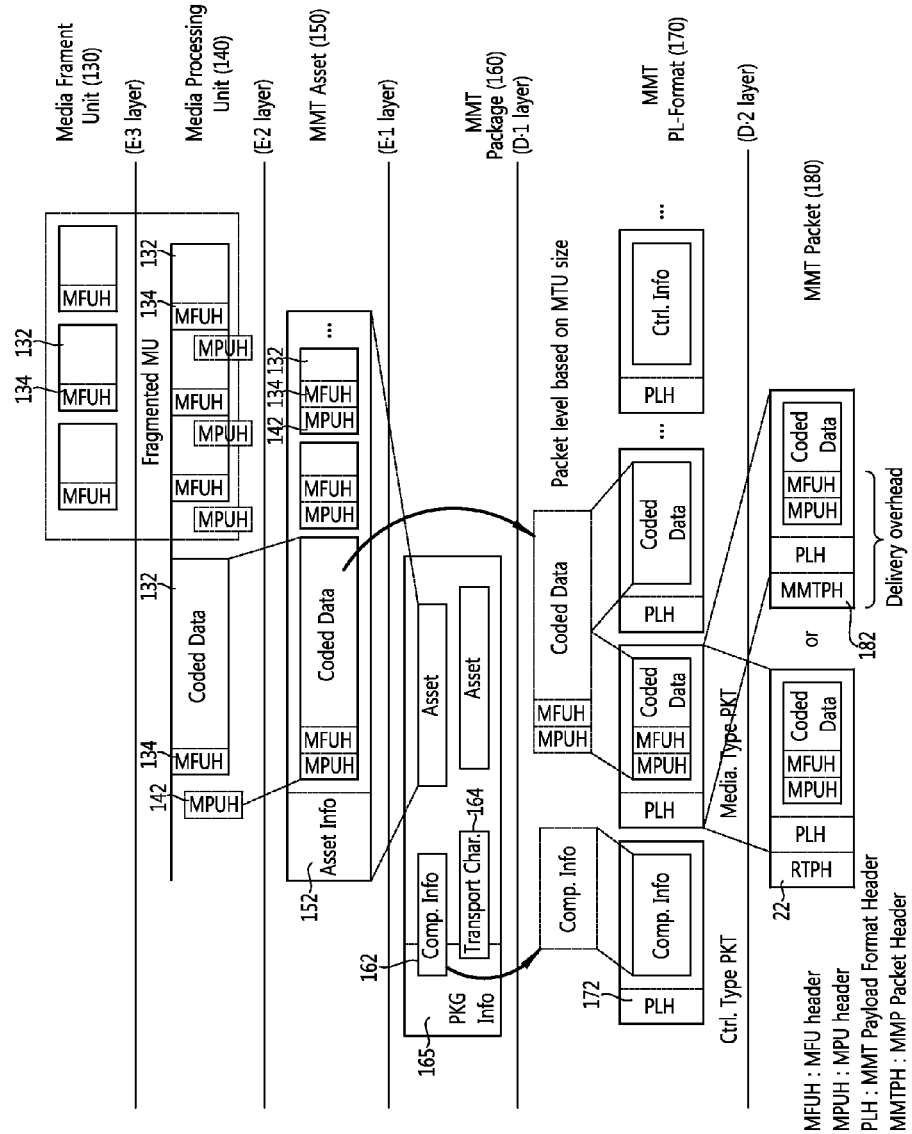
FIG. 2 illustrates a format of unit information (or data or packet) which is used for each layer of an MMT layer structure.

FIG. 2 illustrates a format of unit information (or data or packet) which is used for each layer of an MMT layer structure.

The Media Fragment Unit (MFU) defines the format which encapsulates the part of AU in the transport layer in order to perform the adaptive transmission in the range of MFU. The MFU may be used in transmitting a specific format of the encoded media so that the AU part may be independently decoded or discarded.

The Media Fragment Unit (MFU) 130 is composed of the coded media fragment data 132 and a Media Fragment Unit Header (MFUH) 134. The media fragment unit 130 has a general container format which is independent of a specific codec and loads the smallest data unit which may be independently consumed in the media decoder. The MFUH 134 may include media characteristics, for example, additional information such as loss tolerance. The MFU 130 may become, for example, a picture or slice of video.

The MFU includes an identifier for distinguishing one MFU from other MFUs and has general relation information between MFUs within a single AU. The dependence relation between the MFUs in a single AU is explained, the related priority of the MFU is explained as part of such information. The information may be used in handling transmission in the lower transport layer. For example, the transport layer may omit transmission of MFUs which may be discarded in order to support QoS transmission in an insufficient bandwidth.

The MPU is a set of media fragment units including a plurality of media fragment units 130. The MPU includes a general container format which is independent of a specific codec and includes media data which is equivalent with the access unit. The MPU may include a timed data unit or a non-timed data unit. The MPU may include media fragment unit data and a Media Processing Unit Header (MPUH) including additional information such as a time stamp for synchronization.

The MPU is data which is independently and completely processed by an object which follows the MMT, and the process includes encapsulation and packetization. The MPU may include part of data having a format which is formed of at least one MFU or is defined by another standard.

A single MPU may accommodate the integral number or non-timed data of at least one AU. For time data, AU may be transmitted from at least one MFU, but one AU may not be fragmented into a plurality of MPUs. In the non-timed data, one MPU accommodates part of non-timed data which are independently and completely processed by an object which follows MMT.

The MPU may be uniquely identified within the MMT package with a sequence number and the associated asset ID which distinguishes the sequence number from other MPUs.

The MPU has at least one random access point. A first byte of the MPU payload may always be started with an arbitrary access point. In the time data, the fact means that the decoding order of the first MFU is always 0 in the MPU payload. In the time data, the presentation period and decoding order of each AU may be sent to notify presentation time. The MPU does not have its own initial presentation time, and the presentation time of the first AU of one MPU may be described in the composition information. The composition information may specify the first presentation time of the MPU.

The MPU may include the MMT hint track. For packetized transmission of MPU, the MMT hint track may provide information for converting the encapsulated MPU into the MMT payload and MMT packet.

The MMT hint track implies the fragmentation of the MPU to a transmission unit. As such, at least one MFU may be used to generate the MMT payload. The media data is generated and transmitted to the MMT payload at the point of time of transmission by the transmission unit. Hence, the stored format may be different from the format at the time of transmission. In such a case, a dynamic transmission unit for extracting media data and MMT payload may be required at the time of transmission.

The MMT hint track implies extraction and generation of MFU for encapsulation which uses the MMT payload format. The MMT payload may include MPU metadata or at least one MFU. The MMT hint track implies the method of extracting MFU data to the transmission unit. If fragmentation is not used, the hint track may be omitted.

The MMT hint track may represent an entry format of a sample. Each media sample is designated in at least one MFU, and the sample of the MMT hint track generates at least one MFU.

The MMT hint track includes a plurality of parameters. For example, if the MMT hint track includes the value 1, it may include multilayer_flag indicating the provision of the multi-layer information. The dependency_id is ID indicating dependency of the MFU. If the value is not 0, the video is improved by at least one scalability level in terms of at least one of temporal, qualitative, and spatial resolutions. The depth_id indicates whether the MFU transmits depth data of the video. The quality_id is the quality ID of the MFU. If the value is not 0, the video is improved by at least one scalability level in terms of at least one of temporal, qualitative, and spatial resolutions. The temporal_id is the temporal ID of the MFU. If the value is not 0, the video is improved by at least one scalability level in terms of at least one of temporal, qualitative, and spatial resolutions. The view_id is the view ID of the MFU. If the value is not 0, the video is improved by at least one scalability level in terms of at least one of temporal, qualitative, and spatial resolutions. Further, the hint track may have a layer_id parameter which indicates the id of the scalable layer in which the scalability dimensions information is provided in the initial information.

The MMT asset 150 is a set of MPUs which are composed of a plurality of MPUs. The MMT asset 150 is a data entity which is composed of a plurality of MPUs (timed or non-timed data) from a single data source, and MMT asset information 152 may include additional information such as asset packaging metadata and data type. The MMT asset 150 may include video, audio, program information, MPEG-U widget, JPEG image, MPEG 4 File Format (FF), Packetized Elementary Streams (PES), and MPEG Transport Stream (M2TS).

Further, MMT asset may be a logical data object having encoded media data. The MMT asset includes MMT asset header and encoded media data. The encoded media data may be a group of MPUs which are referenced as a group with the same MMT asset id. The data of the respectively consumed type as an object which is directly associated with the MMT client may be a separated MMT asset. Some examples of such data types are MPEG-2 TS, PES, MP4 file, MPEG-U widget package, and JPEG files.

The encoded media of MMT asset may be time data or non-timed data. The time data is audio-visual media data which requires synchronized decoding and presentation of specific data at a designated point of time. The non-timed data is data of a data type which may be decoded and provided at an arbitrary point of time according to service provision or user interaction.

The service provider may integrate MMT assets and generate a multimedia service while putting the MMT assets on the space-time axis.

The MMT package 160 is a set of MMT assets including one or more MMT assets 150. The MMT assets within the MMT package may be multiplexed or concatenated like a chain.

The MMT package is a container format for MMT asset and configuration information. The MMT package provides a storage space for MMT asset and configuration information for the MMT program.

The MMT program provider encapsulates encoded data as MMT asset and generates configuration information as explaining the temporal and spatial layout of transmission characteristics of the MMT asset. The MU and MMT asset may be directly transmitted to D.1 payload format. The configuration information may be transmitted by S.1 presentation session management message. However, the MMT provider and client, which allow the relay or later reuse of the MMT program, store the MMT program in an MMT package format.

When parsing the MMT package, the MMT program provider determines the transmission path (e.g., a broadcast or broadband) at which the MMT asset is transmitted to the client. The configuration information in the MMT package is transmitted to S.1 presentation session management message along with the transmission related information.

The client receives S.1 presentation session management message so that the client realizes which MMT program is possible and how the MMT asset for the MMT program is received.

The MMT package may also be transmitted by D.1 payload format. The MMT package is packetized and transmitted as D.1 payload format. The client receives the packetized MMT package, forms the whole or part of the MMT package, and consumes the MMT program.

The package information 165 of the MMT package 160 may include configuration information. The configuration information may include additional information such as the list of MMT assets, package identification information, composition information 162, and transport characteristics 164. The composition information 162 includes information on the relationship between MMT assets 150.

Further, the composition information 162 may further include information for indicating the relationship between a plurality of MMT packages when one content set is composed of a plurality of MMT packages. The composition information 162 may include information on the temporal, spatial, and adaptive relationship within the MMT package. The composition information provides information for package transmission optimization and expression in the multi-screen environment. In the multi-screen environment, information for mapping the asset in a specific screen may be indicated, which will be described in detail later.

As in the information which helps the transmission and presentation of the MMT package, the composition information in the MMT provides information for the spatial and temporal relation between MMT assets within the MMT package.

MMT-CI is a descriptive language which provides such information by extending HTML5. If the HTML5 was designed to explain the page-based presentation of the text-based contents, the MMT-CI mainly expresses the spatial relationship between sources. In order to support the expression which reveals the temporal relation between MMT assets, the HTML5 may be extended to include additional attributes of media elements which consume various MMT assets in HTML5 and time information which determines transmission and consumption order of MMT assets, and information related to the MMT assets in the MMT package as in the presentation resource.

Transport characteristics information 164 includes information on the transport characteristics, and information, which is needed to determine the delivery condition of each MMT asset (or MMT packet), may be provided. The transport characteristics information may include traffic description parameters and QoS descriptor.

The traffic description parameter may include the bitrate information on the Media Fragment Unit (MFU) 130 or MPU, priority information, etc. The bitrate information may include information on whether the MMT asset is a Variable Bitrate (VBR) or a Constant Bitrate (CBR), a guaranteed bitrate for the Media Fragment Unit (MFU) (or MPU), and the maximum bit rate for the Media Fragment Unit (MFU) or (MPU). The traffic description parameter may be used for resource reservation between a server, a client and other components on the delivery path, and for example, may include maximum size information of the Media Fragment Unit (MFU) (or MPU) within the MMT asset. The traffic description parameter may be periodically or non-periodically updated.

The QoS descriptor includes information for QoS control, for example, delay information and loss information. The loss information, example, may include a loss indicator on whether the delivery loss of the MMT asset is allowed. For example, when the loss indicator is 1, it indicates "lossless", and when the loss indicator is 0, it indicates "lossy". The delay information may include a delay indicator which is used in distinguishing sensitivity of a transmission delay of MMT asset. The delay indicator may indicate whether the type of the MMT asset is conversation, interactive, real time, and non-real time.

One content set may be composed of one MMT package. Further, one content set may be composed of a plurality of MMT packages.

When one content set is composed of a plurality of MMT packages, composition information or configuration information, which indicates temporal, spatial, and adaptive relationship between a plurality of MMT packages, may exist inside one MMT package or outside the MMT package among MMT packages.

For example, in the case of the hybrid delivery, some of the content components are transmitted through a broadcast network and others of the content components may be transmitted through a broadband network. For example, in the case of a plurality of audiovisual (AV) streams which form one multiview service, one stream may be transmitted to a broadcast network and another stream may be transmitted to a broadband network, and each AV stream may be multiplexed and individually received to the client terminal so as to be stored. Further, for example, application software such as widget is transmitted to a broadband network, and the AV stream (AV program) may be transmitted to the existing broadcast network.

In the case of the multiview service scenario and/or widget scenario, a plurality of AV streams may become one MMT package. In this case, one of a plurality of streams may be stored only in one client terminal, the storage content becomes part of the MMT package, and the client terminal needs to re-record the composition information and configuration information, and the re-recorded contents become a new MMT package which is not related to the server.

In the case of the multi-view service scenario and/or widget scenario, each AV stream may become one MMT package. In this case, a plurality of MMT packages form one content set, recording is performed in MMT package units in the storage, and composition information or configuration information indicating the relationship between MMT packages is needed.

The composition information or configuration information, which is included in one MMT package, may refer to the MMT asset within another MMT package and may express the external side of the MMT package which refers to the MMT package in the out-band situation.

Method of Hybrid Delivery of SVC Video Contents

As described above, the contents, which become the subject of transmission through the MMT scheme, may be SVC video contents including the base layer and at least one enhanced layer. One SVC video contents may be composed of one MMT package or a plurality of MMT packages. That is, a plurality of layers included in the SVC video contents may be included in one MMT package or may be included after being separated into a plurality of MMT packages.

When one SVC video content set is composed of a plurality of MMT packages, composition information or configuration information, which indicate relationship between a plurality of MMT packages, may exist inside one MMT package or outside the MMT package among MMT packages.

In the case of the hybrid delivery, some of the content components may be transmitted through a broadcast network and others of the content components may be transmitted through a broadband network. For example, a base layer which forms one SVC video contents and a base layer among one or more enhanced layers are transmitted to a broadcast network, and enhanced layers may be transmitted to a broadband network. Further, the base layer and at least one enhanced layer may be transmitted through a broadcast network and one or more enhanced layers may be transmitted through the broadband network. Here, each layer may be multiplexed and be individually received so as to be stored.

In the case of the SVC video contents, a plurality of layers may become one MMT package as a whole, and in this case, one of a plurality of layers may be stored only in one client terminal. Further, storage contents may become part of the MMT package, the client terminal needs to re-record composition information or configuration information, and the re-recorded contents become a new MMT package which is not related with the server.

Here, the base layer needs to be transmitted to the client terminal, and enhanced layers may be selected based on at least one of the client terminal's capabilities and transmission environments (e.g., the network bandwidth), and only some enhanced layers may be stored in the client terminal. Hence, they may become MMT package of new SVC video contents which fit the terminal performance and transmission environments.

In the case of the above SVC video contents, each layer may be composed of one MMT package, and in this case, a plurality of MMT packages form one content, the content is recorded as MMT package units in the storage, and composition information or configuration information indicating the relationship between MMT packages is needed.

The composition information or configuration information which is included in one MMT package may refer to MMT assets within another MMT package, and the external side of the MMT package, which refers to the MMT package in the out-band situation, may be expressed. For example, the base layer, one or more enhanced layers and composition information are included in one MMT package, and when one or more enhanced layers are included in another MMT package, the composition information may refer to the base layer and enhanced layer within the same MMT package and the enhanced layer within another MMT package.

When there are a plurality of MMT packages, the composition information may be included only in one MMT package and may be included in each MMT package. Hereinafter, an example of MMT package configuration based on SVC video contents according to various embodiments of the present invention is illustrated with reference to FIGS. 3 to 10.

Hybrid transmission through the broadcast network and broadband network have been illustrated, but the scope of the present invention is not limited to the hybrid transmission through the broadcast network and broadband network, and as the hybrid transmission scheme according to embodiments of the present invention, one or more may be selected from various networks such as the broadcast network, the broadband network, the cable network, and the satellite communication network.

Further, each layer, which is included in the SVC video contents, may respectively form one MMT asset. Hence, the relationship between the MMT package and the MMT assets may represent the relationship between the MMT package and respective layers. The explanation about the configuration of the MMT package below is based on the fact that the base layer or enhanced layer is the MMT asset unit, but the hybrid transmission method of the SVC video contents according to embodiments of the present invention is not limited to the transmission of MMT asset units, and may be transmitted in sub-stream units, MMT package units, or MMT packet units. In this case, in order to form each transmission unit, separation and coupling may be performed by sub-streams, MMT packages, or MMT packets.

Figure 3:
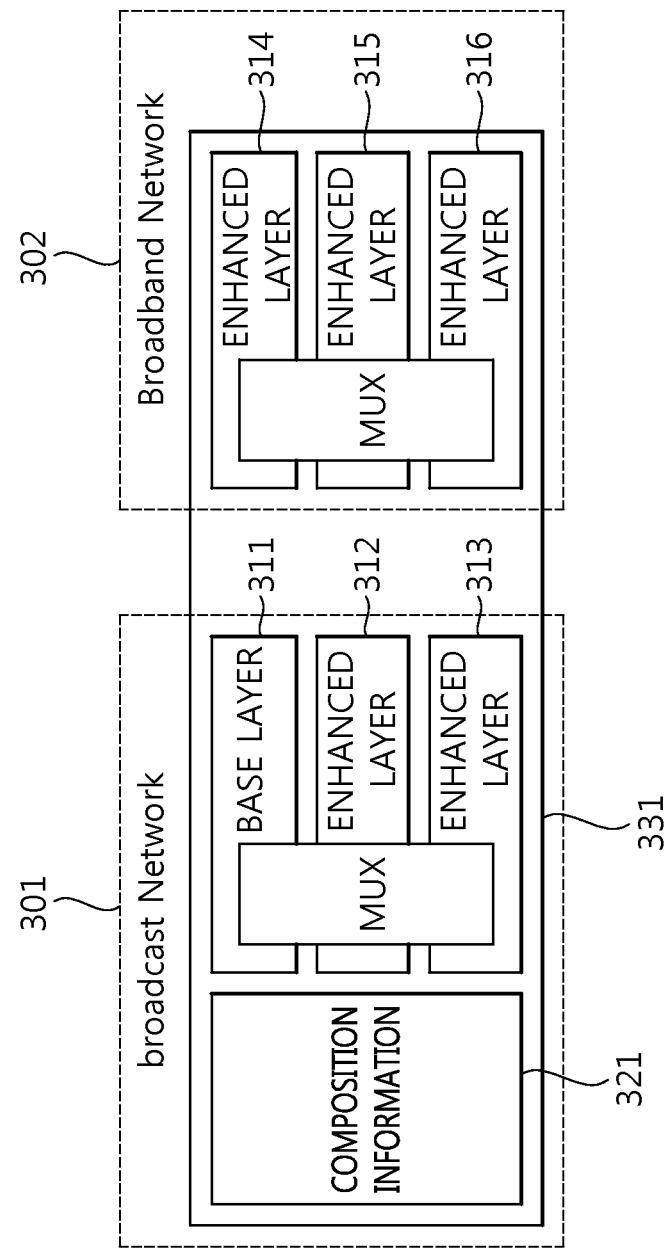
FIG. 3 illustrates a first example of an MMT package configuration according to an embodiment of the present invention.

FIG. 3 illustrates a first example of an MMT package configuration according to an embodiment of the present invention.

The first example shows a case where one SVC video content is formed as one MMT package. As illustrated in FIG. 3, the MMT asset 311 of the base layer and MMT assets 312 and 313 of the enhanced layer which are part of the content components of the SVC video contents are transmitted through the broadcast network 301, and the MMT assets 314, 315, and 316 of the enhanced layer may be transmitted through the broadband network 302. Here, the MMT assets 311, 312, and 313, which are transmitted through the broadcast network, may be multiplexed (MUX), and the MMT assets 314, 315, and 316, which are transmitted through the broadband network, may also be multiplexed (MUX).

Here, MMT assets 311, 312, 313, 314, 315, and 316, which are all content components that form one content, may be included in one MMT package 331 as a whole. Further, the composition information between the MMT assets 311, 312, 313, 314, 315, and 316 may be included in the MMT package 331.

Here, the composition information may include media type information of MMT assets (here, the media type may be one of video, audio, and subtitle), which are referenced by the composition information, and the media size, the number of layers, and information on whether the MMT assets are the base layer or enhanced layer.

Figure 4:
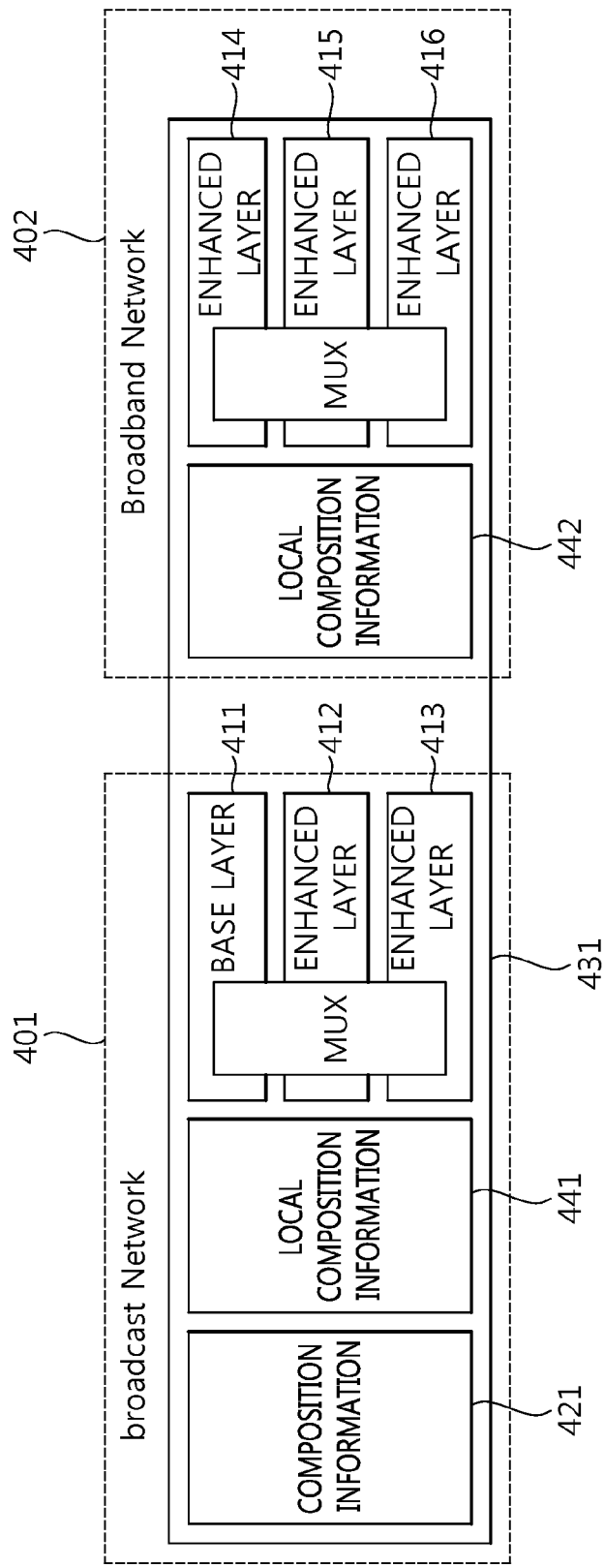
FIG. 4 illustrates a second example of an MMT package configuration according to an embodiment of the present invention.

FIG. 4 illustrates a second example of an MMT package configuration according to an embodiment of the present invention.

The second example illustrates a case where one content is formed of one MMT package and includes local composition information. As illustrated in FIG. 4, the MMT asset 411 of the base layer and the MMT assets 412 and 413 of the enhanced layer, which are part of the content components of the SVC video contents, are transmitted through the broadcast network 401, and the MMT assets 414, 415, and 416 of the enhanced layer, which is the remaining part of the content components of the SVC video contents, may be transmitted through the broadband network 402. Here, the MMT assets 411, 412, and 413, which are transmitted through the broadcast network, may be multiplexed, and the MMT assets 414, 415, and 416, which are transmitted through the broadband network, may also be multiplexed (MUX).

Further, the MMT assets 411, 412, 413, 414, 415, and 416, which are all components that form one content, may be included in one MMT package 431 as a whole. Here, the MMT package 431 may include local composition information 441 indicating the relationship between the MMT assets 411, 412, and 413 which are transmitted through the broadcast network, the local composition information 442 indicating the relationship between the MMT assets 414, 415, and 416 which are transmitted through the broadband network, and the composition information indicating the relationship between the local composition information 441 and the local composition information 442.

Here, the local composition information may include media type information of MMT assets (here, the media type may be one of video, audio, and subtitle), which are referenced by the composition information, and the media size, the number of layers, and information on whether the MMT assets are the base layer or enhanced layer.

Figure 5:
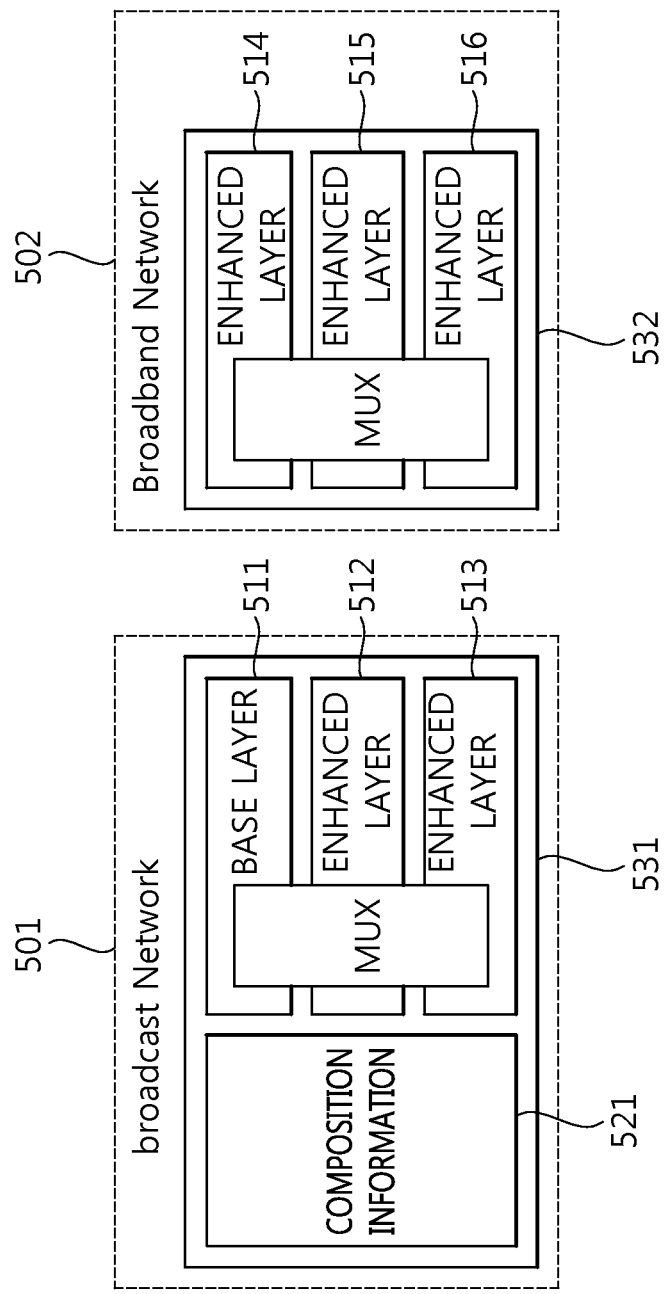
FIG. 5 illustrates a third example of an MMT package configuration according to an embodiment of the present invention.

FIG. 5 illustrates a third example of an MMT package configuration according to an embodiment of the present invention.

FIG. 5 illustrates a case where one content is composed of a plurality of MMT packages. As illustrated in FIG. 5, MMT asset 511 of the base layer and MMT assets 512 and 513 of the enhanced layer, which are part of content components of the SVC video contents, are transmitted through the broadcast network 501, and MMT assets 514, 515, and 516 of the enhanced layer, which is the remaining part of the content components, may be transmitted through the broadband network 502. Here, the MMT assets 511, 512, and 513, which are transmitted through the broadcast network, may be multiplexed (MUX), and the MMT assets 514, 515, and 516, which are transmitted through the broadband network, may also be multiplexed (MUX).

Here, MMT assets 511, 512, and 513, which are part of the content components, are included in one MMT package 531, and the MMT assets 514, 515, and 516, which are the remaining part of the content components, may be included in another MMT package 532. That is, one SVC video content may be composed of a plurality of MMT packages 531 and 532. Further, the composition information 521 indicating the relationship between the MMT packages may be included in one of the MMT package 531 and the MMT package 532.

Here, the composition information may include media type information of MMT assets (here, the media type may be one of video, audio, and subtitle), which are referenced by the composition information, and the media size, the number of layers, and information on whether the MMT assets are the base layer or enhanced layer.

Figure 6:
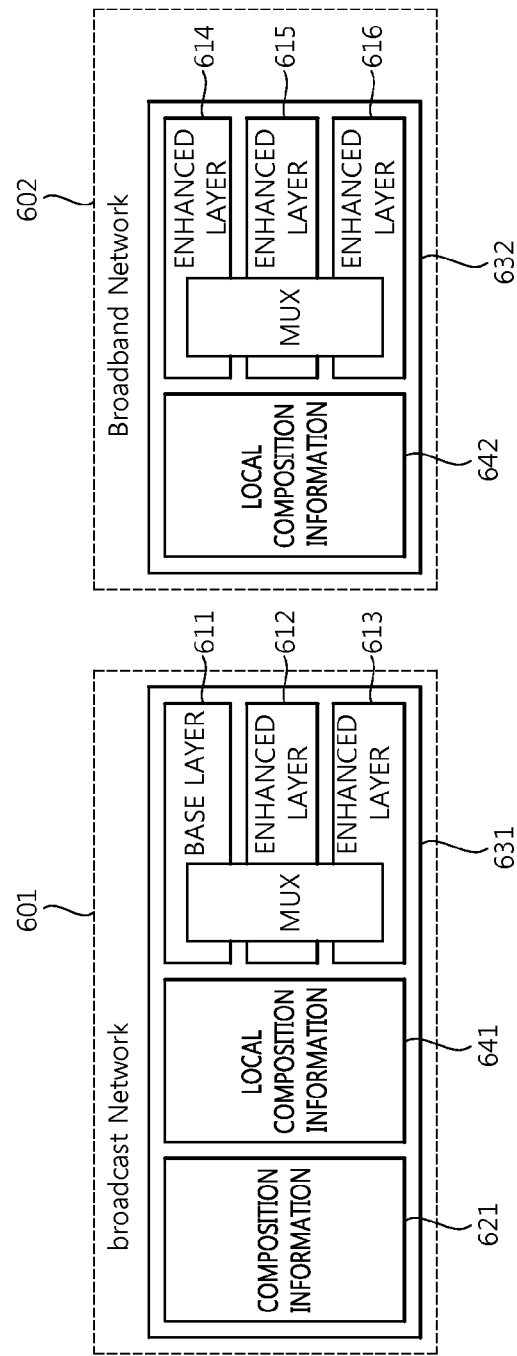
FIG. 6 illustrates a fourth example of an MMT package configuration according to an embodiment of the present invention.

FIG. 6 illustrates a fourth example of an MMT package configuration according to an embodiment of the present invention.

The fourth example illustrates a case where one SVC video content is composed of a plurality of MMT packages and includes local composition information. As illustrated in FIG. 6, the MMT asset 611 of the base layer and the MMT assets 612 and 613 of the enhanced layer, which are part of the content components of the SVC video contents, are transmitted through the broadcast network 601, and the MMT assets 614, 615, and 616 of the enhancement, which is the remaining part of the content components, may be transmitted through the broadband network 602. Here, MMT assets 611, 612, and 613, which are transmitted through the broadcast network, may be multiplexed, and the MMT assets 614, 615, and 616, which are transmitted through the broadband network, may also be multiplexed.

Further, MMT assets 611, 612, and 613, which are part of the content components of the SVC video contents, are included in one MMT package 631, and the MMT assets 614, 615, and 616, which are the remaining part of the content components, may be included in another MMT package 632. That is, one content may be composed of a plurality of MMT packages 631 and 632.

Here, the MMT package 631 may include local composition information 641 indicating the relationship between MMT assets 611, 612, and 613 which are transmitted through the broadcast network, and the MMT package 632 may include local composition information 642 indicating the relationship between the MMT assets 614, 615, and 616 which are transmitted through the broadband network. Further, the composition information 621 indicating the relationship between the local composition information sets 641 and 642 may be included one of the MMT package 631 and the MMT package 632.

Here, the local composition information may include media type information of MMT assets (here, the media type may be one of video, audio, and subtitle), which are referenced by the local composition information, and the media size, the number of layers, and information on whether the MMT assets are the base layer or enhanced layer.

Figure 7:
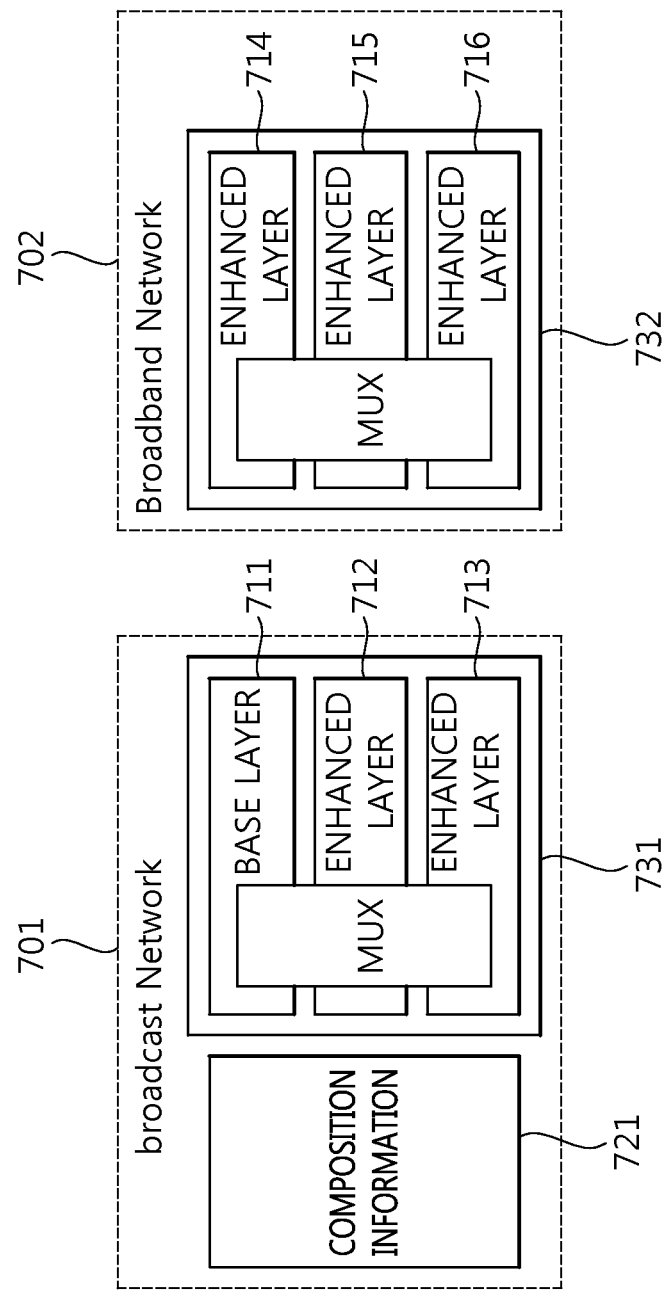
FIG. 7 illustrates a fifth example of an MMT package configuration according to an embodiment of the present invention.

FIG. 7 illustrates a fifth example of an MMT package configuration according to an embodiment of the present invention.

The fifth example illustrates a case where one SVC video content is composed of a plurality of MMT packages. As illustrated in FIG. 7, an MMT asset 711 of the base layer and MMT assets 712 and 713, which are part of the content components of the SVC video contents, are transmitted through a broadcast network 701, and MMT assets 714, 715, and 716 of the enhanced layer, which is the remaining part of the content components, may be transmitted through the broadband network 702. Here, the MMT assets 711, 712, and 713, which are transmitted through the broadcast network, may be multiplexed, and the MMT assets 714, 715, and 716, which are transmitted through the broadband network, may also be multiplexed.

Here, MMT assets 711, 712, and 713, which are part of the content components, are included in one MMT package 731, and the MMT assets 714, 715, and 716, which are the remaining part of the content components, may be included in another MMT package 732. That is, one SVC video content may be composed of a plurality of MMT packages 731 and 732. Further, the composition information 721 indicating the relationship between the MMT packages 731 and 732 may exist outside the MMT packages 731 and 732.

Here, the composition information may include media type information of MMT assets (here, the media type may be one of video, audio, and subtitle), which are referenced by the composition information, and the media size, the number of layers, and information on whether the MMT assets are the base layer or enhanced layer.

Figure 8:
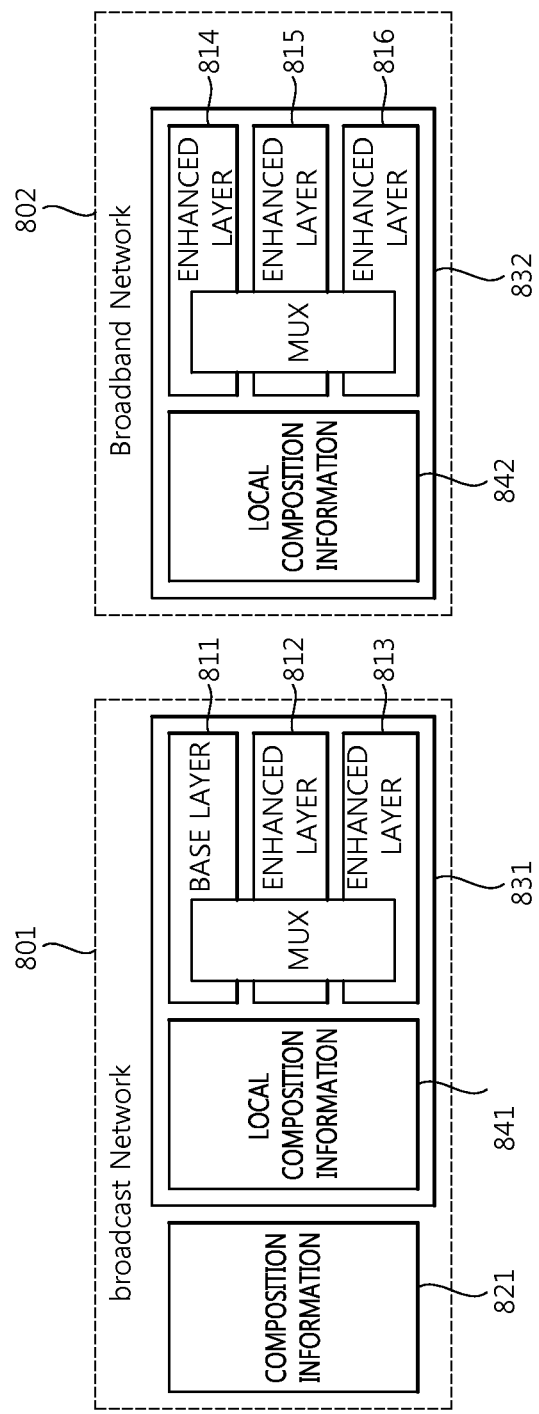
FIG. 8 illustrates a sixth example of an MMT package configuration according to an embodiment of the present invention.

FIG. 8 illustrates a sixth example of an MMT package configuration according to an embodiment of the present invention.

The sixth example illustrates a case where one SVC video content is composed of a plurality of MMT packages and includes local composition information. As illustrated in FIG. 8, the MMT asset 811 of the base layer and the MMT assets 812 and 813 of the enhanced layer, which are part of the content components of the SVC video contents, may be transmitted through the broadcast network 801, and the MMT assets 814, 815, and 816 of the enhanced layer, which are the remaining part of the content components, may be transmitted through the broadband network 802. Here, the MMT assets 811, 812, and 813, which are transmitted through the broadcast network, may be multiplexed (MUX), and the MMT assets 814, 815, and 816, which are transmitted through the broadband network, may also be multiplexed (MUX).

Further, the MMT assets 811, 812, and 813, which are part of the content components, are included in one MMT package 831, and the MMT assets 814, 815, and 816, which are the remaining part of the content components, may be included in another MMT package 832. That is, one content may be composed of a plurality of MMT packages 831 and 832.

Here, the MMT package 831 may include local composition information 841 indicating the relationship between MMT assets 811, 812, and 813 which are transmitted through the broadcast network, and the MMT package 832 may include local composition information 842 indicating the relationship between the MMT assets 814, 815, and 816 which are transmitted through the broadband network. Further, the composition information 821 indicating the relationship between the local composition information sets 841 and 842 may exist outside the MMT packages 831 and 832.

Here, the local composition information may include media type information of MMT assets (here, the media type may be one of video, audio, and subtitle), which are referenced by the local composition information, and the media size, the number of layers, and information on whether the MMT assets are the base layer or enhanced layer.

The case of the hybrid delivery through the broadcast network and the broadband network was illustrated, but two or more may be selected as the hybrid delivery scheme from among the broadcast network, the broadband network, the cable network, and the satellite communication network. Further, one MMT package may form one SVC video content or a plurality of MMT packages may form one SVC video content for three or more various transmission networks.

Figure 9:
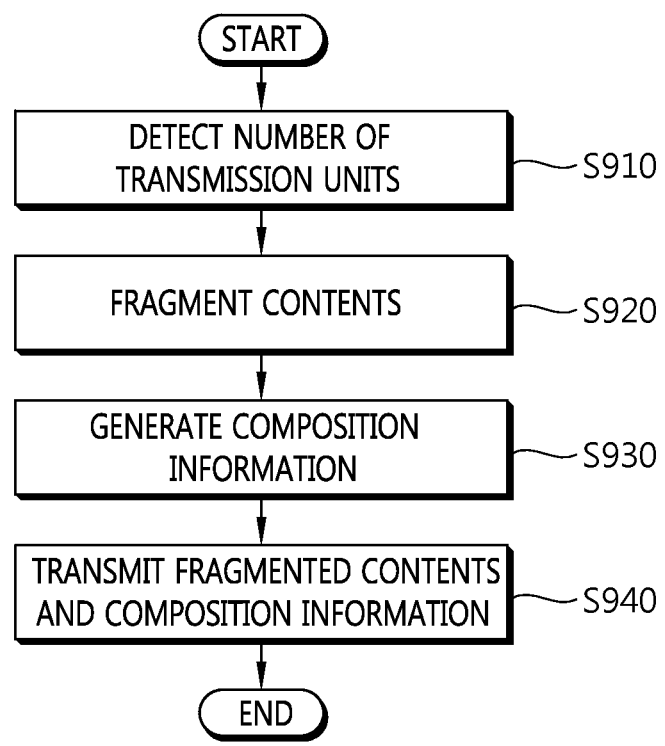
FIG. 9 is a flowchart illustrating a hybrid delivery method of SVC video contents according to an embodiment of the present invention.

FIG. 9 is a flowchart illustrating a hybrid delivery method of SVC video contents according to an embodiment of the present invention.

As described above, hybrid delivery through various heterogeneous transmission networks has become possible, and various transmission networks including the cable network and the satellite communication network as well as the broadcast network and the broadband network have been developed. Hence, a hybrid delivery method of SVC video contents having the optimal transmission efficiency by utilizing the transmission network to the full by detecting the number of transmission networks for transmitting the SVC video contents from the server to the client among various transmission networks based on the current communication situation, fragmenting the SVC video contents into a number corresponding to the number of the detected transmission networks, and generating and transmitting information relationship between the fragmented contents by various methods. Here, the SVC video contents include the base layer and at least one enhanced layer, and thus the fragmented contents may include each base layer or at least one enhanced layer. That is, a plurality of layers may be separated to correspond to the number of the transmission networks so as to be transmitted.

As illustrated in FIG. 9, the hybrid delivery method of the SVC video contents according to an embodiment of the present invention may include the operation of fragmenting SVC video contents to be transmitted from the server to the client and generating composition information of the fragmented SVC video contents, and the operation of transmitting the fragmented SVC video contents to the client by using the transmission network (S940). Here, the operation of fragmenting the SVC video contents and generating composition information may include the operation of detecting the number of transmission networks for transmitting the SVC video contents to be transmitted to the client by the server (S910), the operation of fragmenting the SVC video contents into the number corresponding to the number of the detected transmission networks (S920), and the operation of generating composition information of the fragmented SVC video contents (S930).

In the operation of detecting the number of transmission networks for transmitting the SVC video contents to be transmitted to the client by the server (S910), the number of transmission networks is detected by detecting all transmission networks which are available to transmit the contents. Two or more may be selected as the transmission network from among the broadcast network, the broadband network, the cable network, and the satellite communication network. Further, characteristics of each transmission network such as the transmission speed may be detected as well as the number of the transmission networks.

In the operation of fragmenting the SVC video contents to correspond to the number of the detected transmission networks (S920), the SVC video contents may be fragmented into the number corresponding to the detected transmission networks. When fragmenting the SVC video contents into the number corresponding to the number of the transmission networks, if the characteristics of each transmission network are detected in the detection operation (S910), the contents may be fragmented based on the characteristics of the transmission network and the number of the transmission networks. The fragmented contents may be audio information, video information, additional data information, or widget information. The audio information, the video information, the additional data information, or the widget information may be respectively included in one fragmented content or may be included in a plurality of fragmented contents.

Here, the content may include at least one MMT asset. The fragmented contents may include the same number of MMT assets and may include a different number of MMT assets based on the characteristics of the transmission network. Further, the fragmented contents may form one MMT package, or the fragmented contents may individually form one MMT package.

In particular, the fragmented SVC video contents may include at least one of MMT assets of the base layer and the MMT assets of the enhanced layer. As described above, the SVC video contents may include one base layer and at least one enhanced layer, and the base layer or enhanced layer may be composed of MMT assets. Hence, when the SVC video contents are fragmented, the fragmented SVC video contents may include MMT assets of the base layer and include MMT assets of one or more enhanced layers. Further, the fragmented SVC video contents may include both the MMT assets of the base layer and the MMT assets of one or more enhanced layers.

The contents may be fragmented in sub-stream units, MMT package units, or MMT packet units as well as in MMT asset units. As described above, when the video contents are SVC video contents composed of a plurality of layers such as the first layer and the second layer, the video contents may be fragmented in layer units. The same number of the MMT assets, sub-streams, MMT packages, or MMT packets may be included in each fragmented content, or a different number may be included based on the characteristics of the transmission network.

In the operation of generating composition information of the fragmented SVC video contents (S930), composition information indicating the relationship between the fragmented contents may be generated. In the operation of fragmenting the contents (S920), when the fragmented contents individually form one MMT package, the composition information may represent the relationship between respectively formed MMT packages. Further, the generated composition information may be included in one of respectively formed MMT packages or may separately exist. Referring to FIG. 2, the composition information 162 may be included in the package information 165 of the MMT package.

In particular, the composition information of the SVC video contents may include media type information of MMT assets (here, the media type may be one of video, audio, and subtitle), which are referenced by the composition information, and the media size, the number of layers, and information on whether the MMT assets are the base layer or enhanced layer.

Based on the media type information, it is possible to determine the data type of the corresponding MMT asset from among video data, audio data, and the subtitle. Further, when the MMT asset is video data, the composition information may include size information of the video data (media). Further, the composition information may include the number of layer included in the SVC video contents and information indicating whether the MMT assets are the MMT asset of the base layer or the MMT asset of the enhanced layer.

Further, In the operation of fragmenting the contents (S920), if the contents are fragmented in sub-stream units, MMT package units, MMT packet units, or layer units, the composition information may indicate the relationship between respective fragmented contents. Further, the composition information may be included in the header 182 or payload of the MMT packet as well as package information 165, may be included in unit information of another MMT layer structure, or may exist through separate configuration.

Specifically, referring to FIGS. 3 to 8, as illustrated in FIG. 3, the fragmented contents may form one MMT package 331, and the composition information 321 indicating the relationship between the fragmented contents may be included in the MMT package 331.

Further, as illustrated in FIG. 4, the fragmented contents may form one MMT package 431 as a whole, and the composition information sets 441 and 442 indicating the relationship between MMT assets which are included in the respective fragmented contents, and the composition information 421 indicating the relationship between the local composition information sets 441 and 442 may be included in the MMT package 431.

Further, as illustrated in FIG. 5, the fragmented contents may form respective MMT packages 531 and 532, and the composition information 521 indicating the relationship between the MMT packages 531 and 532 may be included in the MMT package 531 which is one of the MMT packages 531 and 532.

Further, as illustrated in FIG. 6, the fragmented contents may form respective MMT packages 631 and 632, and respective MMT packages 631 and 632 may include local composition information sets 641 and 642 indicating the relationship between MMT assets which are included in the respective MMT packages 631 and 632. Further, the composition information indicating the relationship between the local composition information sets 641 and 642 may be included in the MMT package 631 which is one of the MMT packages 631 and 632.

Further, as illustrated in FIG. 7, the fragmented contents may form respective MMT packages 731 and 732, and the composition information indicating the relationship between the MMT packages 731 and 732 may exist outside the MMT packages 731 and 732.

Further, as illustrated in FIG. 8, the fragmented contents may for respective MMT packages 831 and 832, and the respective MMT packages 831 and 832 may include local composition information sets 841 and 842 indicating the relationship between the MMT assets which are included in the respective MMT packages 831 and 832. Further, the composition information 821 indicating the relationship between the local composition information sets 841 and 842 may exist outside the MMT packages 831 and 832.

The case where the contents are fragmented based on the MMT assets was illustrated above, but the contents may be fragmented in sub-stream units, MMT package units, or MMT packet units as well as MMT assets.

In the operation of transmission of contents (S940), the fragmented SVC video contents are transmitted to the client by using the transmission network. When the composition information exist outside the MMT package, the fragmented SVC video contents and the composition information may be transmitted to the client by using the transmission network. When the SVC video contents are fragmented in consideration of the characteristics of the transmission network, respective transmission networks may transmit fragmented contents corresponding to the characteristics of the respective transmission networks.

Method of Receiving SVC Video Contents

Figure 10:
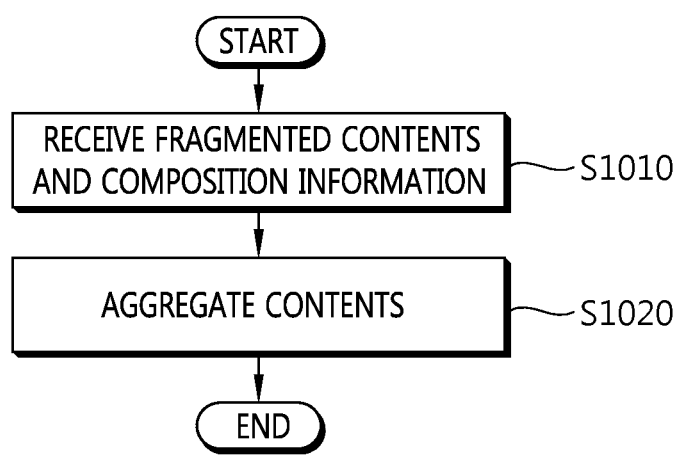
FIG. 10 is a flowchart illustrating a method of receiving SVC video contents according to an embodiment of the present invention.

FIG. 10 is a flowchart illustrating a method of receiving SVC video contents according to an embodiment of the present invention.

As illustrated in FIG. 10, the method of receiving contents according to an embodiment of the present invention may include the operation of receiving fragmented SVC video contents from a server (S1010) and the operation of aggregating the fragmented SVC video contents based on the composition information included in the fragmented SVC video contents (S1020).

In the operation of receiving the contents, the client receives fragmented SVC video contents from the server (S1010). Here, when the contents are fragmented in consideration of characteristics of the transmission network, the fragmented contents may be received by using each transmission network corresponding to the characteristics of each transmission network. The operation of receiving the contents (S1010) may receive the fragmented contents and composition information if the composition information exists outside the MMT packages.

When the client receives only part of the fragmented contents, the client may generate second composition information indicating the relationship between some received, fragmented contents based on the contents and composition information. Here, the fragmented contents may be sub-stream, MMT asset, MMT package, or MMT packet.

In the operation of aggregating contents (S1020), the fragmented contents are aggregated based on the composition information or second composition information.

Synchronization Method at Hybrid Delivery

One content component may be transmitted through a broadcast network and another content component may be transmitted through a broadband network. Further, one content may be transmitted through a broadcast network and another content may be transmitted through another broadcast network.

At hybrid transmission, a signaling message for checking the type and location of media components for synchronization of different types of MMT and MPEG-2 TS may be used. The signaling message clearly states the address of media components. In the situation that is used along with the MPEG-2 TS in the broadcast channel, the location of the MPEG-2 TS is used.

MPEG-2 TS component includes a STC-based timestamp. The MMT component includes a UTS-based timestamp. In order to synchronize timestamps of different types of the MMT and the MPEG-2 TS, a clock relation information message is required.

In a receiver corresponding to the MMT, STC-based clock of MPEG-2 TS may be converted into a UTC-based system clock (wall clock) as the clock relation information is used. MMT component and MPEG-2 TS component may be synchronized and provided by sharing the same time domain such as the system clock.

Method of Correcting Errors at Hybrid Delivery

When scalable video coding (SVC) video data is transmitted by hybrid delivery, if errors occur in the received data of some layers, error correction is explained.

It is assumed that there are a transmission unit and a reception unit, and the transmission unit hybrid-transmits SVC video data composed of the basic layer and the first enhanced layer to the reception unit. The transmission unit transmits the base layer data through the first network and transmits the first enhanced layer data to the receiver through the second network. The reception unit receives the data of the first layer through the first network and receives the data of the first enhanced layer through the second network. When there is an error in the basic layer data which is received by the reception unit, the error may be corrected by using another part of the received based layer data. However, if an error, which cannot be corrected by using only the basic layer data, occurs, the reception unit performs error correction of the basic layer data by additionally using the data of the first enhanced layer which is received through the second network. As such, even when an error, which cannot be corrected, occurs in the basic layer data which is received through the first network, if data of the first enhanced layer, which is received through the second network, has been received without an error, the error of the received basic layer data may be corrected. In a reverse manner, when there is an error in the data of the enhanced layer and there is no error in the basic layer data, the error may be corrected.

According to a hybrid transmission method and reception method of MMT-packaged SVC video contents according to an embodiment of the present invention, layers of SVC video contents may be appropriately distributed to correspond to the number of transmission networks so as to be transmitted and received by detecting the number of possible transmission networks. Hence, hybrid transmission having the optimal transmission efficiency in various environments is possible.

What is claimed is:

1. A hybrid delivery method of scalable video coding (SVC) video contents, the hybrid delivery method comprising:
   fragmenting the SVC video contents to be transmitted to a client by a server; and
   transmitting the fragmented SVC video contents to the client by using a plurality of transmission networks,
   wherein a signaling message for synchronization between the fragmented SVC video contents which are transmitted through the plurality of transmission networks is transmitted along with the SVC video contents,
   wherein the signaling message includes Clock Relation Information (CRI) for synchronization of different types of timestamps,
   wherein a MPEG Multimedia Transport (MMT) packet for transmitting the fragmented SVC video contents is generated by generating media processing unit (MPU)

by encapsulating media fragment unit (MFU) being smaller than an access unit (AU) and contained data processed by a media decoder, and by generating an MMT asset based on at least one MPU, and by generating MMT package including at least one MMT asset, the composition information (CI) and transport characteristics (TC), and by adding an MMT packet header to MMT payload generated by referring to the MMT package, the MPU being container for independently decodable timed or non-timed data and the MMT asset being a logical grouping of MPUs that share the same asset ID, and wherein the composition information comprises information on spatial and temporal relationship among the MMT assets.

2. The hybrid delivery method of claim 1, wherein the fragmented SVC video contents include at least one of an MPEG Media Transport (MMT) asset of a base layer and an MMT asset of an enhanced layer.

3. The hybrid delivery method of claim 2, wherein the MMT asset includes a Media Processing Unit (MPU), and the MPU includes fragmentation information of the SVC video contents.

4. The hybrid delivery method of claim 3, wherein the MPU includes an MMT hint track including fragmentation information of the MPU.

5. The hybrid delivery method of claim 4, wherein the MMT hint track includes fragmentation information of the SVC video contents.

6. The hybrid delivery method of claim 1, wherein the fragmenting of the SVC video contents to be transmitted to the client by the server comprises fragmenting the SVC video contents to be transmitted to the client by the server and generating composition information of the fragmented SVC video contents.

7. The hybrid delivery method of claim 6, wherein the composition information includes at least one of media type information of MMT assets included in the fragmented SVC video contents referenced by the composition information, a media size, the number of layers, and information on whether the MMT assets are a base layer or an enhanced layer, wherein the media type is one of a video, an audio, and a subtitle.

8. The hybrid delivery method of claim 6, wherein the composition information is included in at least one of package information of an MMT package, a header and payload of an MMT packet.

9. The hybrid delivery method of claim 6, wherein the transmitting of the fragmented SVC video contents comprises transmitting the fragmented SVC video contents and the composition information to the client when the composition information exists outside the fragmented SVC video contents.

10. The hybrid delivery method of claim 6, wherein the generating of the composition information by fragmenting the SVC video contents comprises: detecting the number of transmission networks through which the SVC video contents to be transmitted to the client by the server may be transmitted; fragmenting the SVC video contents to correspond to the number of the detected transmission networks; and generating composition information of the fragmented SVC video contents.

11. The hybrid delivery method of claim 1, wherein the fragmented SVC video contents individually form one MMT package.

12. A method of receiving contents, the method comprising:
receiving SVC video contents which are fragmented from a server through a plurality of transmission networks;
receiving a signaling message for synchronization between the fragmented SVC video contents through at least one among the plurality of transmission networks; and
aggregating the fragmented SVC video contents based on the received signaling message,
wherein the signaling message includes Clock Relation Information (CRI) for synchronization of different types of timestamps,
wherein a MPEG Multimedia Transport (MMT) packet for transmitting the fragmented SVC video contents is generated by generating media processing unit (MPU) by encapsulating media fragment unit (MFU) being smaller than an access unit (AU) and contained data processed by a media decoder, and by generating an MMT asset based on at least one MPU, and by generating MMT package including at least one MMT asset, the composition information (CI) and transport characteristics (TC), and by adding an MMT packet header to MMT payload generated by referring to the MMT package, the MPU being container for independently decodable timed or non-timed data and the MMT asset being a logical grouping of MPUs that share the same asset ID, and
wherein the composition information comprises information on spatial and temporal relationship among the MMT assets.

13. The method of claim 12, wherein the receiving of the fragmented SVC video contents comprises receiving the fragmented SVC video contents and the composition information from the server when the composition information exists outside the fragmented SVC video contents.

14. The method of claim 12, wherein the receiving of the fragmented SVC video contents comprises generating second composition information indicating relationship between the received fragmented contents and a part of fragmented contents which are received based on composition information.

15. The method of claim 12, wherein the aggregating of the fragmented SVC video contents comprises aggregating the fragmented SVC video contents based on composition information which is included in the fragmented SVC video contents.

16. The method of claim 12, further comprising:
correcting an error of the received SVC video contents.

* * * * *